United States Patent [19]

Shoji

[11] Patent Number: 6,140,905
[45] Date of Patent: Oct. 31, 2000

[54] ELECTRICALLY CONDUCTIVE CONTACT PIN HAVING A TEMPERATURE FUSE FUNCTION

[75] Inventor: Hideki Shoji, Iwaki, Japan

[73] Assignee: Toyo System Co., Ltd., Fukushima, Japan

[21] Appl. No.: 09/338,893

[22] Filed: Jun. 23, 1999

[30] Foreign Application Priority Data

Jun. 23, 1998 [JP] Japan .................................. 10-176404

[51] Int. Cl.⁷ ........................... H01H 37/76; H01R 13/68
[52] U.S. Cl. .......................... 337/407; 337/401; 337/408; 337/407; 337/414; 439/621; 439/622; 439/890
[58] Field of Search ..................................... 337/407, 401, 337/402, 403, 405, 408, 414, 417, 178; 439/250, 621, 622, 890

[56] References Cited

U.S. PATENT DOCUMENTS

| | | | |
|---|---|---|---|
| 2,361,666 | 10/1944 | Triplett | 200/117 |
| 3,420,217 | 1/1969 | Powell et al. | 123/198 |
| 3,682,130 | 8/1972 | Jeffers | 116/114.5 |
| 3,781,737 | 12/1973 | Henry | 337/407 |
| 3,924,215 | 12/1975 | Allison | 337/190 |
| 4,065,741 | 12/1977 | Sakamoto et al. | 337/407 |
| 4,068,204 | 1/1978 | Iwanari et al. | 337/408 |
| 4,109,229 | 8/1978 | Plasko | 337/408 |
| 4,126,845 | 11/1978 | Iimori et al. | 337/408 |
| 4,189,697 | 2/1980 | Hara | 337/407 |
| 4,198,613 | 4/1980 | Whitley | 333/181 |
| 4,203,086 | 5/1980 | Smith | 337/410 |
| 4,210,893 | 7/1980 | Hara | 337/407 |
| 4,246,564 | 1/1981 | Olson et al. | 337/409 |
| 4,276,532 | 6/1981 | Aoki | 337/408 |
| 4,281,309 | 7/1981 | Olson | 337/409 |
| 4,326,186 | 4/1982 | Clay | 337/407 |
| 4,383,236 | 5/1983 | Urani et al. | 337/403 |
| 4,441,093 | 4/1984 | Okazaki | 337/404 |
| 4,673,909 | 6/1987 | Schwob et al. | 337/407 |
| 4,782,240 | 11/1988 | Davidson | 307/10 BP |
| 5,326,283 | 7/1994 | Chen | 439/622 |
| 5,805,047 | 9/1998 | De Villeroche et al. | 337/290 |
| 5,880,667 | 3/1999 | Altavela et al. | 337/376 |
| 5,982,270 | 11/1999 | Wolfe, Jr. et al. | 337/401 |

FOREIGN PATENT DOCUMENTS

| | | | |
|---|---|---|---|
| 2-030028 | 1/1990 | Japan | H01H 37/76 |
| 3-101026 | 4/1991 | Japan | H01H 37/76 |
| 3-283223 | 12/1991 | Japan | H01H 37/76 |
| 4-190038 | 7/1992 | Japan | F24F 13/14 |
| 11-003642 | 1/1995 | Japan | H01H 37/76 |
| 7-006676 | 1/1995 | Japan | H01H 37/76 |
| 11-111134 | 4/1999 | Japan | H01H 37/76 |

*Primary Examiner*—Leo P. Picard
*Assistant Examiner*—Anatoly Vortman
*Attorney, Agent, or Firm*—Muramatsu & Associates

[57] ABSTRACT

An electrically conductive contact pin having a temperature fuse function includes an electricity conducting element formed in an approximately cylindrical shape divided into an electrode contact portion and an outer electric contact portion, a holding body for holding the electricity conducting element provided around the outer electric contact portion such that the holding body may slide along the surface of the outer contact portion, a pressing member for pressing the outer electric contact portion upward provided between the holding body and the electrode contact portion, and an actuator for actuating to expand the distance between the electrode contact portion and the outer electric contact portion upon melting of the heat sensitive electrically conductive melt body. The electrically conductive contact pin may be consisted of two electricity conducting route by having a measurement element inside. The measurement element is electrically insulated from the electricity conducting element and may be electrically disconnected together with the electricity conducting element by the operation of the actuator.

9 Claims, 5 Drawing Sheets

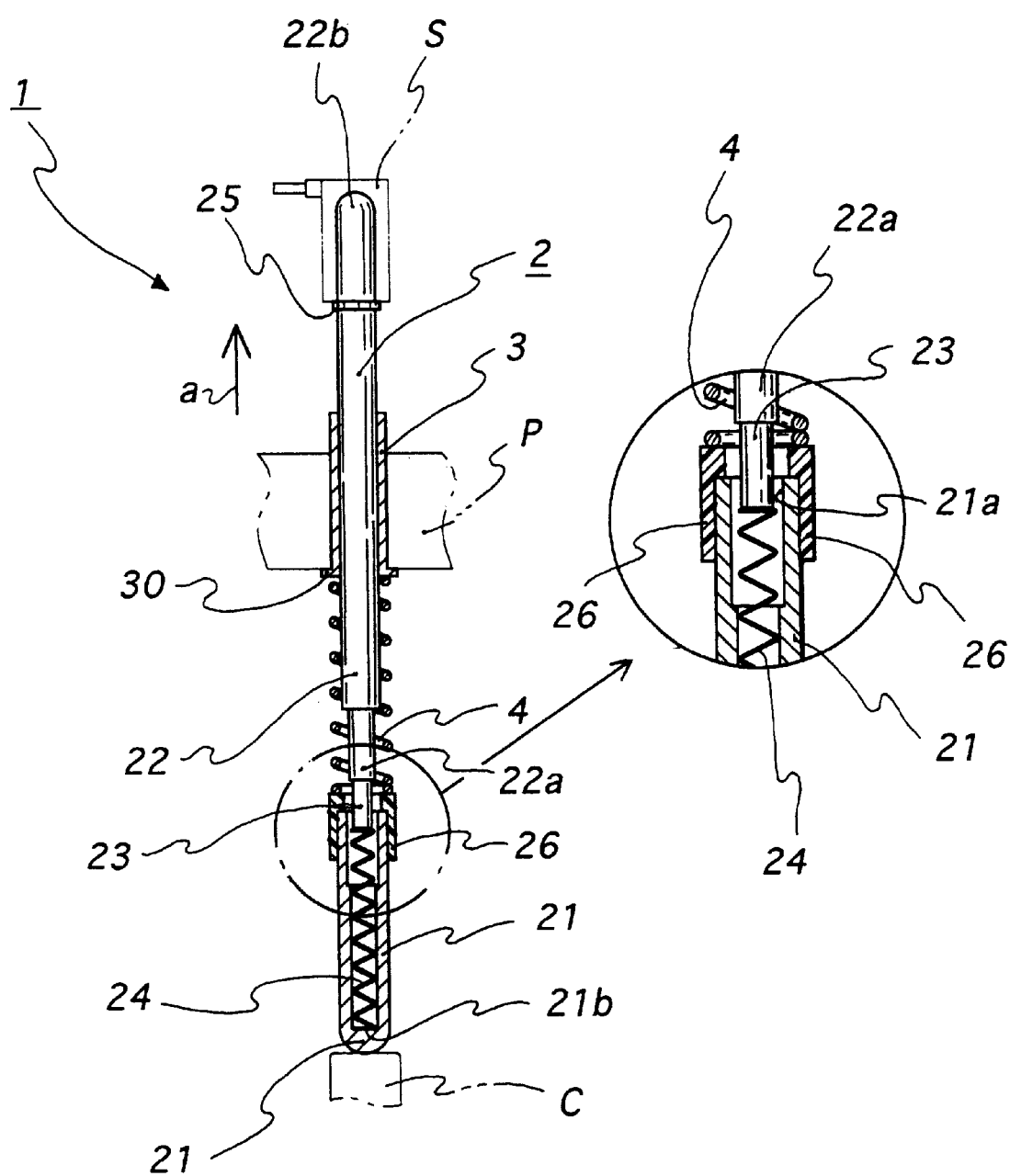

ELECTRICALLY CONDUCTIVE CONTACT PIN HAVING A TEMPERATURE FUSE FUNCTION

FIELD OF THE INVENTION

This invention relates to an electrically conductive contact pin having a temperature fuse function, and more particularly, to an electrically conductive contact pin having a temperature fuse function for electrically connecting a battery and a charging device by functioning as an electrode of a charge-discharge device of a storage battery and sensing the rise of temperature of the battery to suspend the electricity charge or discharge.

BACKGROUND OF THE INVENTION

Owing to the recent popularization of portable electric devices, the demand for mold type storage batteries such as nickel cadmium batteries, nickel hydrogen batteries and lithium ion batteries is increasing.

These batteries are manufactured usually by assembling electrodes made by activated material under an electrically discharged condition. Before delivering to customers, the batteries are charged electricity, activated by repeating the charge and discharge of electricity, or voltage or capacity of the battery is inspected by conducting the charge and discharge of electricity.

When a high voltage or a large amount of electricity is charged into a mold type battery or electricity is charged or discharged beyond the capacity of the mold type battery, gases are generated inside the battery, causing the increase of the inner pressure as well as the increase in the inner temperature of the battery. In order to prevent the increase of the inside pressure and temperature at the occurrence of any abnormalities, a safety valve may be provided inside the battery to discharge the generated gases outside to reduce the inside pressure of the battery. However, rapid generation of gases inside the battery may cause splitting of the battery container and spreading of the organic solution used as an electrolyte outside together with the oxygen and hydrogen contained therein. That eventually might cause fire and damage the surrounding batteries and devices.

As a means for charging or discharging the battery, an electrically conductive contact pin freely detachably provided with the charge and discharge device has been used. In order to ensure the contact of the electrically conductive contact pin with the battery electrode, a pressing means such as a spring or a board spring is provided so as to apply a pressing force to the contacting end. The conventional electrically conductive contact pins are also provided with a controlling means which can suspend the electric charge or discharge in the case of any occurrence of abnormalities of the battery at the time of charge or discharge.

For instance, Japanese Patent Laid Open No. 9-204939 discloses a temperature sensor for measuring the battery temperature which is provided inside the electrically conductive contact pin wherein an electricity suspension means is actuated in response to a signal generated from this sensor.

However, the above method of controlling the electricity charge according to the signal of battery voltage, electric current or battery temperature relies on the normal operation of the electric power supply apparatus or controlling apparatus. These apparatuses might work wrongly in case of occurrence of any failure or noise to the apparatus. That results in an excessive charge or discharge of the battery. Therefore, reliability of this method is insufficient.

Further, in order to continuously monitor the condition of a battery by sensing the charge voltage, charge current and battery temperature, many additional means must be provided inside the electrically conductive contact pin as well as another means for processing the information thus sensed. Therefore, owing to the resultant complex structure of the electric conductive contact pin, the reliability of the device is deteriorated and the production cost of the device inevitably becomes high. Further, the cost of the whole apparatus for charging or discharging the battery also becomes high.

SUMMARY OF THE INVENTION

Therefore, it is an object of the present invention to solve the above problems by providing an electrically conductive contact pin having a temperature fuse function which can suspend the charge or discharge of electricity in response to a rise of temperature of the battery, thereby avoiding the occurrence of a dangerous condition caused by the temperature rise in the electrical device such as a battery without requiring any additional devices.

In order to achieve the above object, the present invention provides an electrically conductive contact pin having a temperature fuse function, comprising:

an electricity conducting element formed in an approximately rod shape comprised of an electrode contact portion and an outer electric contact portion, wherein the two portions are provided in the electricity charging direction and connected with each other by having a heat sensitive electrically conductive melt body therebetween;

a holding body for holding the electricity conducting element such that the holding body may slide along the surface of the outer electric contact portion;

a pressing means for pressing a body of the electricity conducting element to expand the distance between the holding body and the electrode contact portion, wherein the pressing means is electrically insulated from the electrode contact portion and the holding body and provided at a position around the outer electric contact portion and between the holding body and the electrode contact portion in a contracted condition; and an actuating means provided between the electrode contact portion and the outer electric contact portion, wherein the actuating means is electrically separating the electrode contact portion from the outer electric contact portion, conserving the repulsive energy under the restraint force and repulsively actuates upon release of the restraint force by melting the heat sensitive electrically conductive melt body such that the electrode contact portion and the outer electric contact portion are electrically separated from one another.

Further, while above electrically conductive contact pin is comprised of a single electrical conducting route, the electrically conductive contact pin in another aspect of the present invention may be comprised of two electricity conducting routes by forming the electricity conducting element in an approximately cylindrical shape, providing a measurement element along the axis of the electricity conducting element, exposing both ends of the measurement element outside the ends of the electricity conducting element and insulating the measuring element from the electricity conducting element.

Preferably, the measurement element at the side of the electrode contact portion is able to elastically move backward when receiving a reaction force. Above pressing means and/or actuating means are formed of an elastic member such as a coil spring, a heat-resistant elastic resin or a plate spring.

At the initial stage, the electrode contact portion and the outer electric contact portion are connected by the electrically conductive heat sensitive melt body so that electricity may be conducted between the electrode contact portion and outer electric contact portion. At this stage, the actuating means is provided between the electrode contact portion and the outer electric contact portion, conserving the repulsive energy under a restraint force.

The holding body is provided at a predetermined position of the charge and discharge device of the charge-discharge electrical apparatus. The electrode contact portion contacts the electrode of the battery with a pressing force by rendering the pressing means provided therebetween in a contracted condition.

The function of the electrically conductive contact pin of the present invention is performed under this condition.

If the temperature of the battery rises beyond the melting point, the heat sensitive electrically conductive melt body is melted so that the actuating means restrained by the outer electric contact portion is repulsively actuated in response to the release of the restraint force caused by the melting and consequently the electrode contact portion and the outer electric contact portion is separated from one another. At this movement, the route of electricity conduction is disconnected. Since the actuating means is electrically insulated from the electrode contact portion and the outer electric contact portion, there is no risk of conduction of electricity therebetween.

The electrically conductive contact pin of the present invention may be comprised of two electricity conducting routes. One route is formed of the electrode contact portion and the outer electric contact portion, wherein the two portions are connected with each other by the heat sensitive electrically conductive melt body. The other route is formed of the measurement element provided inside the cylindrically shaped electricity conducting element in the axial direction thereof, both ends of which are being exposed outside the electricity conducting element to contact with the electrode of the battery to be charged or discharged and the terminal of the electricity charging apparatus. The measurement element is electrically insulated from the electricity conducting element.

Owing to the repulsive actuation of the actuating means which separates the outer electric contact portion from the electrode contact portion and moves the measurement element upward, the conduction of electricity through the electricity conducting element as well as the measurement element is suspended.

Preferably, the measuring element provided at the side of the electrode contact portion elastically contacts with the electrode with an appropriate pressing force so that the electrode of the device to be charged and the measuring element is more reliably electrically connected.

The pressing means and/or actuation means may be formed of a coil spring, a heat resistance plastic elastic body or a plate spring.

According to the electrically conductive contact pin having a fuse function, the excessive charge by high voltage or large current or charge-discharge of the battery beyond its capacity is prevented so that generation of gases inside the battery, rise of inside pressure or rise of battery temperature can be avoided.

BRIEF EXPLANATION OF THE DRAWINGS

FIG. 2 is a perspective sectional view of the electrically conductive contact pin of the Embodiment 1 of the present invention after its repulsive actuation. An expanded sectional view of its essential part is shown separately.

DETAILED DESCRIPTION OF THE EMBODIMENTS

Referring now the drawings, the embodiments of the present invention are explained in detail as follows:

Embodiment 1

Figure 1A:
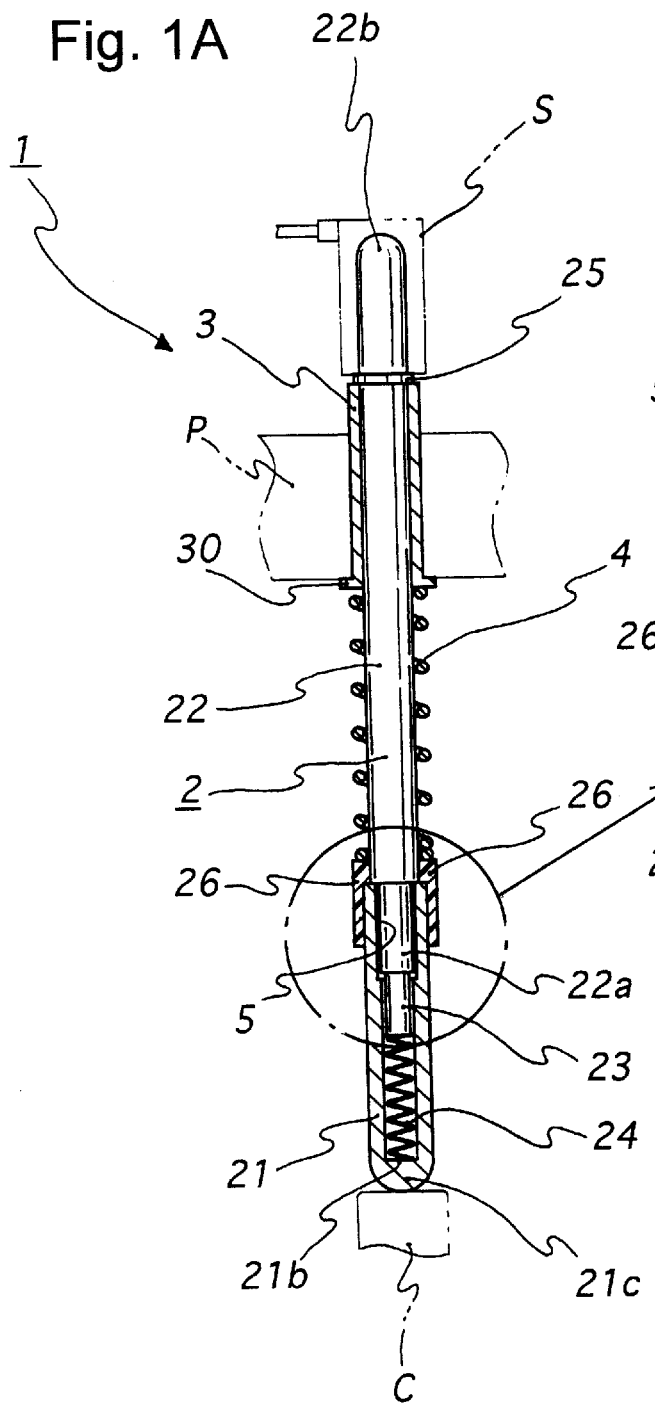
FIG. 1 is a perspective sectional view of the electrically conductive contact pin of the Embodiment 1 of the present invention before its repulsive actuation. An expanded sectional view of its essential part is shown separately.
Figure 1B:
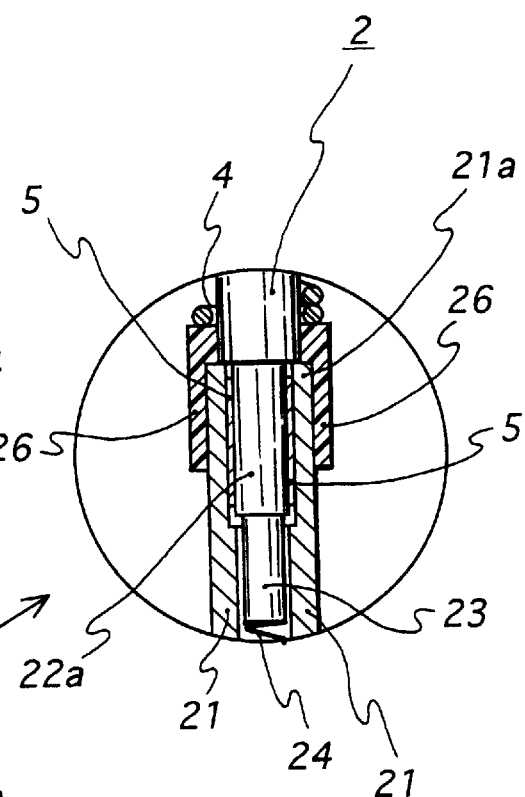

FIG. 1 and FIG. 2 are perspective sectional views of the electrically conductive contact pin of the present invention. FIG. 1 shows the electrically conductive contact pin of the Embodiment 1 before actuation of the actuating means. FIG. 2 shows another perspective view of the electrically conductive contact pin 1 of the Embodiment 1 after actuation of the actuating means. The arrow "a" in FIG. 2 is used merely for explanation of the drawing.

The electrically conductive contact pin 1 of the Embodiment 1 is used for a single route electricity charging device and is comprised of an electricity conducting element 2, a holding body 3 and a coil spring 4 used as a pressing means.

The electricity conducting element 2 is formed of an electrically conductive material such as metal and is divided into an electrode contact portion 21 and an outer electric contact portion 22. The electrode contact portion 21 is formed in a rod shape having a relatively small diameter. The bottom end portion 22a of the outer electric contact portion 22 formed in a cylindrical shape is inserted into the opening 21a of the electrode contact portion 21 by a predetermined length with some play to form a mated portion. In the space created by the play of the mated portion, an alloy 5 having low melting point to be used as an electrically conductive heat sensitive melt body is filled and hardened so as to connect the electrode contact portion 21 and the outer electrically contact portion 22 as an integral body.

An inner coil spring 24 is provided between the bottom portion 21b of the electrode contact portion 21 and the bottom end portion 22a of the outer electric contact portion 22 interposed by an insulating body 23 formed of an electrically non-conductive material such as plastics or ceramics. The inner coil spring 24 is provided as an actuating means in a pressed condition.

The holding body 3 formed in a cylindrical shape having an open upper end and an bottom end is provided around the outer electric contact portion 22. The holding body 3 may slide along the surface of the outer electric contact portion 22 in the axial direction. A stopper 25 provided around the outer electric contact portion 22 forms a stop point of the sliding.

The outer coil spring 4 is provided in a pressed condition around the outer electric contact portion 22 and between a flange 30 provided at the bottom end of the holding body 3 and an insulating cap 26 provided at the upper end 21a of the electrode contact portion 21.

The electrically conductive contact pin 1 of the Embodiment 1 having above configuration functions as follows.

Like the conventional contact pins, the electrically conductive contact pin 1 is inserted into the holding body 3 of the charge-discharge device P from the bottom thereof to the extent the outer coil spring 4 contacts with the flange 30 of the holding body 3. Thereafter, the electricity conducting element 2 is moved in the axial direction so that the bottom end portion 21*c* of the electrode contact portion 21 is contacted with the electrode terminal C of the electrical component with an appropriate amount of pressing force. The upper end portion 22*b* of the outer electric contact portion 22 is connected with the socket S which is connected with the outside power supply apparatus (not shown). Starting from the above condition, the electrically conductive contact pin 1 of the present invention is used for its intended purpose.

If the electric component to be charged or discharged is heated owing to some abnormality, the heat is transferred to the electrically conductive contact pin 1, raising the temperature of the pin to a predetermined degree. Owing to this rise of temperature, the alloy 5 having low melting point is melted, causing the release of the restraint force which has been applied on the inner coil spring 24.

Upon releasing the restraint, the inner coil spring 24 repulsively actuate to press the outer electric contact portion 22 upward in the axial direction (arrow a in FIG. 2), and thereby separate the electrode contact portion 21 from the outer electric contact portion 22. By this movement, the electricity conducting route is disconnected.

In this event, since the insulating body 23 and insulating cap 26 are made of electrically non-conductive material, the inner coil spring 24 and the outer coil spring 4 are electrically disconnected with each other.

Embodiment 2

An electrically conductive contact pin 6 having two electricity conducting routes is shown as Embodiment 2 while the electrically conductive contact pin 1 shown as Embodiment 1 has a single electricity conducting route.

Figure 3:
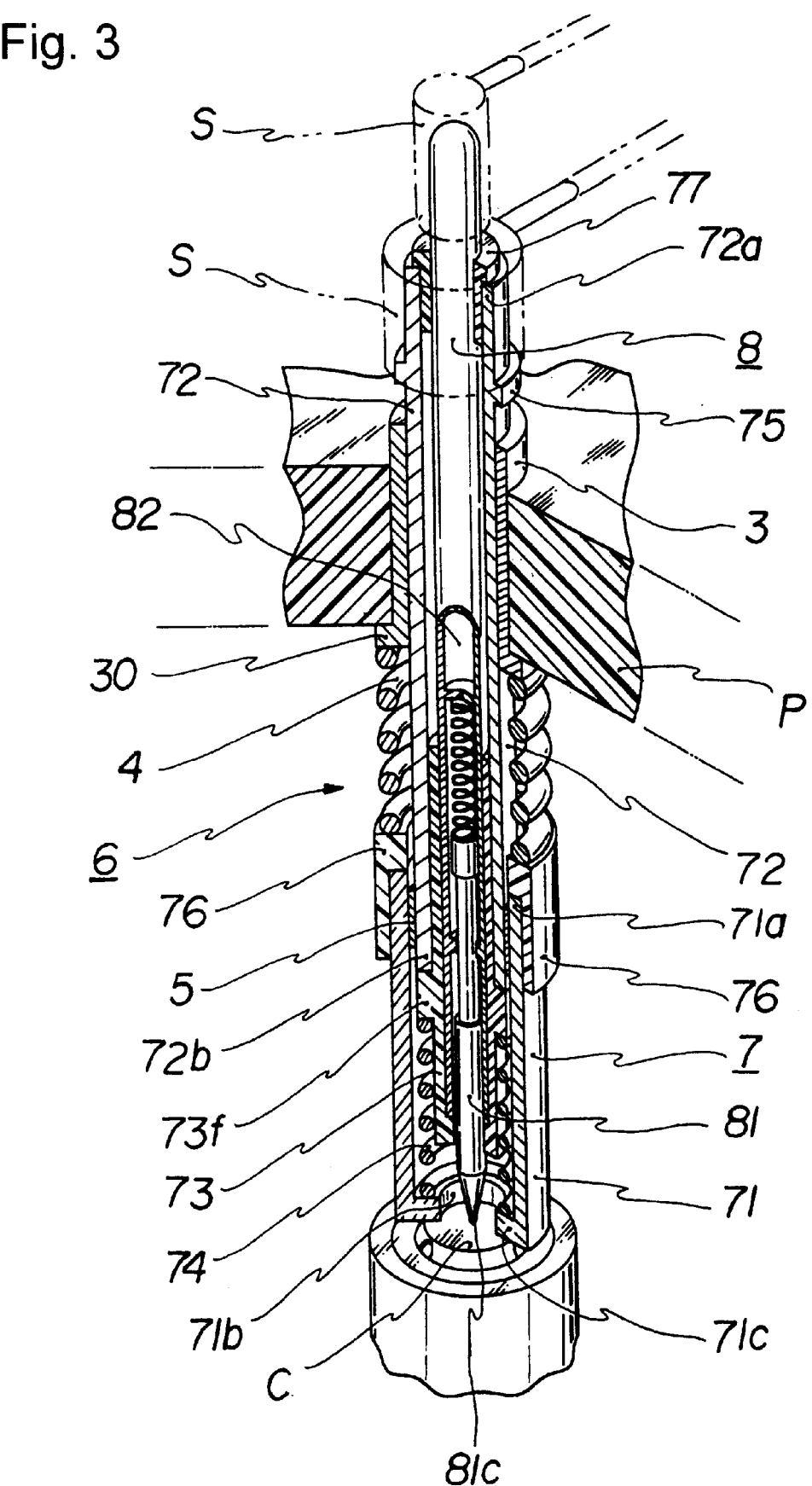
FIG. 3 is a perspective sectional view of the electrically conductive contact pin of the Embodiment 2 of the present invention before its repulsive actuation.
Figure 4:
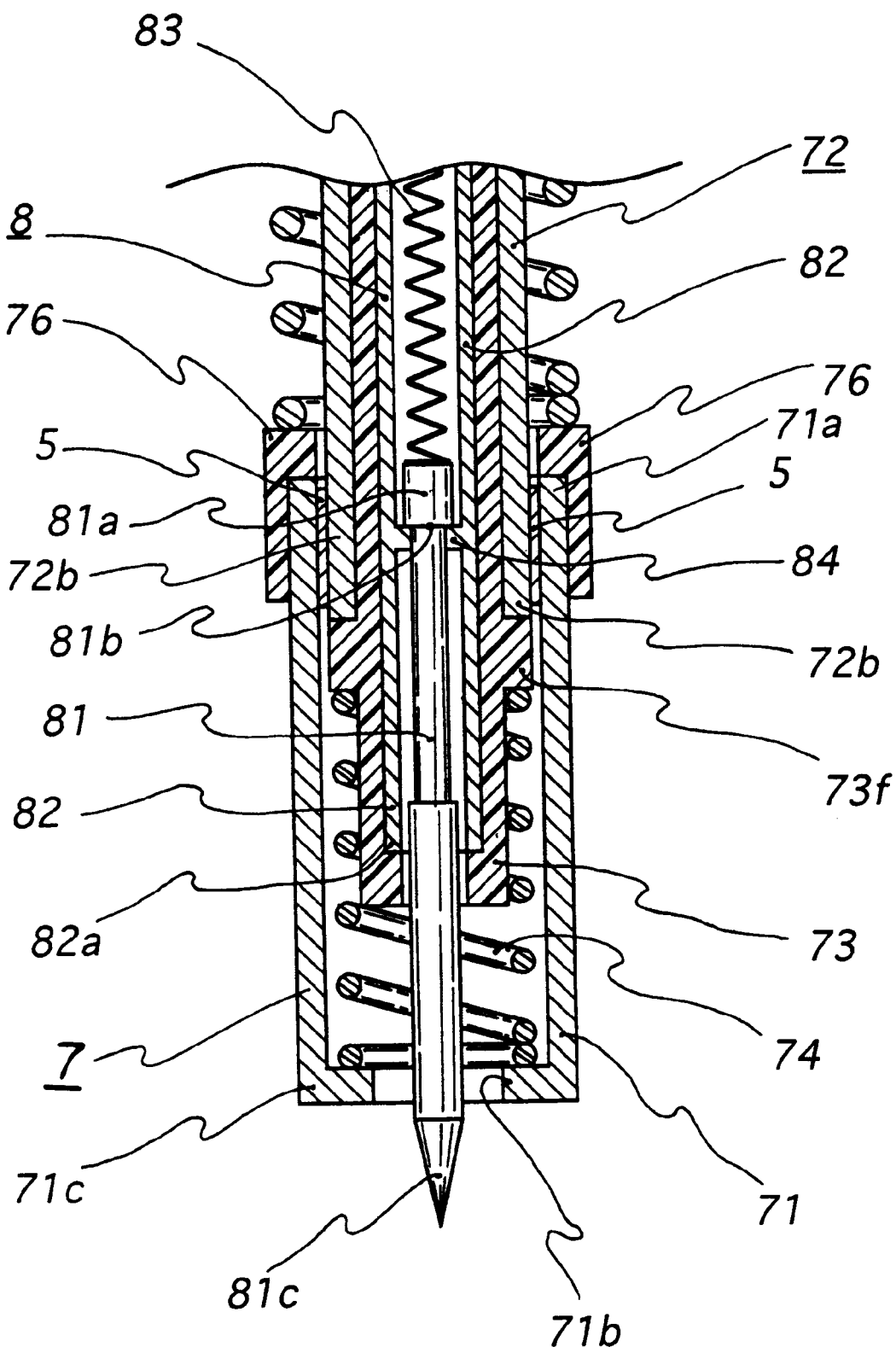
FIG. 4 is an expanded sectional view of the important parts of the electrically conductive contact pin of the Embodiment 2 of the present invention before its repulsive actuation.
Figure 5:
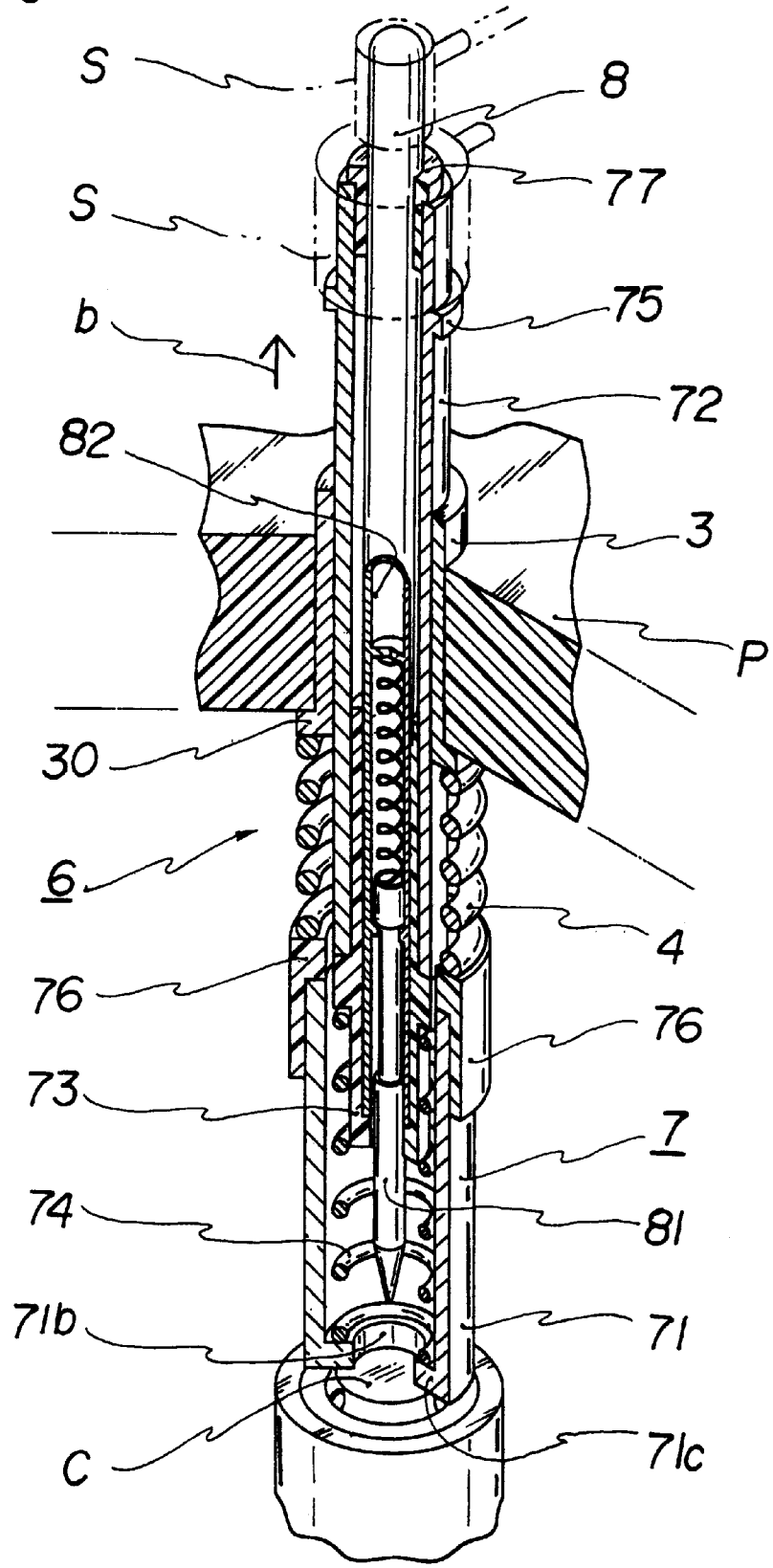
FIG. 5 is a perspective sectional view of the electrically conductive contact pin of the Embodiment 2 of the present invention after its repulsive actuation.

FIG. 3 is a sectional perspective view of the electrically conductive contact pin 6 of the Embodiment 2 before the repulsive actuation. FIG. 4 is an expanded sectional view of the Embodiment 2 of its essential part. FIG. 5 is a perspective sectional view of the electrically conductive contact pin of the Embodiment 2 after the repulsive actuation.

The electrically conductive contact pin 6 of Embodiment 2 is comprised of two electricity conducting routes by forming the electricity conducting element 2 of the Embodiment 1 in an approximately cylindrical shape and providing a measurement element 8 along the axis of the cylindrically shaped electricity conducting element 2 of the Embodiment 1 exposing both ends of the measurement element 8 outside the end of the electricity conducting element 7.

The electricity conducting element 7 of the electrically conductive contact pin 6 of the Embodiment 2 functions as the main body which electrically connects the electrode terminal C and the connecting terminal (not shown) of the outside power supply apparatus. It is formed in a cylindrical shape having an open upper end and a bottom end.

The basic configuration of this electricity conducting element 7 is approximately the same as that of the electricity conducting element 2 of the Embodiment 1, except that the diameter of the electricity conducting element 7 is larger than that of the electricity conducting element 2 of the Embodiment 1.

An electrode contact portion 71 is formed in a cylindrical shape having an open upper and a bottom end. At the bottom end portion 71*c* of the electrode contact portion 71, there is provided an insert hole 71*b* formed in a flange shape. A bottom end 72*b* of the outer electric contact portion 72 formed in a cylindrical shape is inserted into the upper open end portion 71*a* of the electrode electric contact portion 71 by a predetermined length to form a mated portion having some play. A low melting point material 5 is filled in the space created by the play between the bottom end portion 72*b* of the outer electric contact portion 72 and the upper end portion 71*a* to be hardened so that the electrode contact portion 71 and the outer electrically contact portion 72 are connected as an integral body.

An insulating sleeve 73 is inserted into the open bottom end 72*b* of the outer electric contact portion 72. The insulating sleeve 73 is formed in a cylindrical shape having a hole of a predetermined inside diameter wherein the measurement element 8 which is explained later is inserted. A flange 73*f* is provided around the sleeve 73 so as to contact with the opening of the bottom end 72*b* of the outer electric portion 72.

An inner coil spring 74 is provided in a pressed condition between the inner edge of the inserting hole 71*b* and the lower edge of the flange 73*f* around the insulating sleeve 73.

Further, an insulating cap 76 having the same configuration as that of the insulating cap 26 of the Embodiment 1 is provided on the upper open end 71*a* of the electrode contact portion 71.

The main body of the measurement element 8 is comprised of an electrically conductive material such as metal and is formed in an approximately cylindrical shape. It performs an electrical measurement by contacting with the electrode terminal C. The measurement element 8 is partially exposed to outside at the open upper and bottom end of the electric conducting contact pin 6. The lower portion of the measurement element 8 is held by an insulating sleeve 73. The upper portion of the measurement element 8 is held by an insulating cylinder 77 which is inserted into the opening of the upper end of the outer contact portion 72.

The basic configuration and function of the measurement element 8 is the same as the measurement element used in the conventional electrically conductive contact pin. It is formed of a sliding element 81 and a storing cylinder 82 for storing the sliding element 81.

The sliding element 81 constitutes the lower portion of the measuring element 8. The bottom end 81*c* of the sliding element 81 is formed in a cone shape and penetrates the bottom end 82*a* of a storing cylinder 82. The bottom end 81*c* of the sliding element 81 is exposed outside the inserting hole 71*b* of the electrode contact portion 71. Under this condition, the sliding element 81 is stored along the axis of the storing cylinder 82.

A coil spring 83 is provided above the upper end 81*a* of the sliding element 81 in a pressed condition so that the coil spring 83 conserve the repulsive energy to push the sliding element 81 downward at the contact point with the electrode terminal C.

A level difference portion 81*b* is formed at the upper end portion 81*a* of the sliding element 81. By fitting this level difference portion 81*b* with a stopper 84 formed inside the storing cylinder 82, the sliding element 81 is prevented from sliding off from the storing cylinder 82.

The holding body 3 and the outer coil spring 4 have the same configuration as that of the Embodiment 1.

The electrically conductive contact pin 6 of the Embodiment 2 functions as follows.

Like the electrically conductive contact pin 1 of the Embodiment 1, the electrically conductive contact pin 6 is connected to the charge-discharge device P of the outside power supply apparatus to be used for its intended purpose. The measuring element 8 is pressed toward the electrode terminal C by the pressing force of the coil spring 83.

In the event that the electrical component to be electrically charged or discharged is heated owing to an occurrence of a certain abnormality, the heat is transferred to the electrically conductive contact pin 6, thereby melting the low melt point alloy 5, and releasing the restraint force applied on the inner coil spring 74. Owing to this repulsive actuation, the outer electrically contact portion 72 is pressed upward in the axial direction (arrow b in FIG. 5) and thereby the electrode contact portion 71 is separated from the outer electrically contact portion 72. By this movement, the electrical conducting route of the electricity conducting contact pin 6 is disconnected.

Experimental Result

Connecting the outer electric contact portion and the electrode contact portion by heating a heat sensitive melt body which is provided therebetween and made of a low melting point alloy melting at the temperature of 60° C., produced an electrically conductive contact pin of the Embodiment 2. A battery panel was prepared by using the electrically conductive contact pin thus produced.

Installed an AA type nickel cadmium battery to the battery panel thus prepared, and charged that battery with a constant current of 4 ampere, and observed the actuation of the safety valve at the time of excessive charging.

When the temperature of the electrically conductive contact pin rose up to 60° C., the heat sensitive melt body provided between the outer electric contact portion and the electrode contact portion melted and electricity charging was suspended. At the time of the suspension, the temperature of the battery was about 80° C.

Other Possible Embodiments

Some modifications may be made to the above Embodiments. The shape of the electrically conductive contact pin or electricity conducting element is not limited to the cylindrical shape and can be a square pillar shape. The actuation means and pressing means which can be used in the present invention is not limited to the coil spring and can be replaced with other elastic element such as an elastic body made of heat resistance plastics or a plate spring. The outer coil spring or the coil spring on the axis of the contact pin are provided merely to ensure the electrical connections and they are not prerequisite elements of the present invention.

Because the electrically conductive contact pin of the present invention is provided with a means for suspending the electricity charge upon sensing the rise of the temperature, the contact pin can be produced in a simple structure and can ensure a reliable actuation. Further since the size of the electrically conductive contact pin of the present invention may be almost the same as that of the conventional contact pin, the conventional contact pin can be easily replaced with the electrically conductive pin of the present invention without changing the outer charging device. Consequently, the cost for providing additional sensor equipment outside can be saved. Further, since the electrically conductive contact pin of the present invention uses low melting point alloy as the heat sensitive melt body, the error in sensing the actuating temperature can be minimized and the restraint of the coil spring can be reliably ensured.

What is claimed is:

1. An electrically conductive contact pin having a temperature fuse function comprising:

an electricity conducting element formed in an substantially rod shape comprised of an electrode contact portion and an outer electric contact portion, said electrode contact portion and outer electric contact portion being connected with each other by having a heat sensitive electrically conductive melt body therebetween;

a holding body for holding the electricity conducting element provided around the outer electric contact portion such that the holding body may slide along the outer surface of the outer contact portion;

a pressing means for pressing a body of the electricity conducting element to expand the distance between the holding body and the electrode contact portion, said pressing means being electrically insulated from the electrode contact portion and the holding body and provided at a position around the outer electric contact portion and between the holding body and the electrode contact portion in a contracted condition; and an actuating means for actuating to expand the distance between the electrode contact portion and the outer electric contact portion upon melting of the heat sensitive electrically conductive melt body, said actuating means being formed of an electrically non-conductive elastic member and provided at a position inside the electrode contact portion and between the electrode contact portion and the outer electric contact portion in a contracted condition.

2. An electrically conductive contact pin having a temperature fuse function as described in claim 1, further comprising a measurement element formed of an electrically conductive material for conducting an electrical measurement, wherein the electricity conducting element is formed in an substantially cylindrical shape;

the measurement element is formed in an substantially cylindrical shape and provided inside the electricity conducting element along an axis thereof, said measurement element being insulated from the electricity conducting element, and a top end and a bottom end of the measurement element being exposed outside of both ends of the electricity conducting element.

3. An electrically conductive contact pin having a temperature fuse function as described in claim 2, wherein said measurement element is slid back and forward in a direction of an axis of the electricity conducting element by applying a force.

4. An electrically conductive contact pin having a temperature fuse function as described in claim 1, wherein said pressing means is comprised of a coil spring.

5. An electrically conductive contact pin having a temperature fuse function as described in claim 1, wherein said actuating means is comprised of a coil spring.

6. An electrically conductive contact pin having a temperature fuse function as described in claim 2, wherein said pressing means is comprised of a coil spring.

7. An electrically conductive contact pin having a temperature fuse function as described in claim 2, wherein said actuating means is comprised of a coil spring.

8. An electrically conductive contact pin having a temperature fuse function as described in claim 3, wherein said pressing means is comprised of a coil spring.

9. An electrically conductive contact pin having a temperature fuse function as described in claim 3, wherein said actuating means is comprised of a coil spring.

* * * * *